Patented July 3, 1934

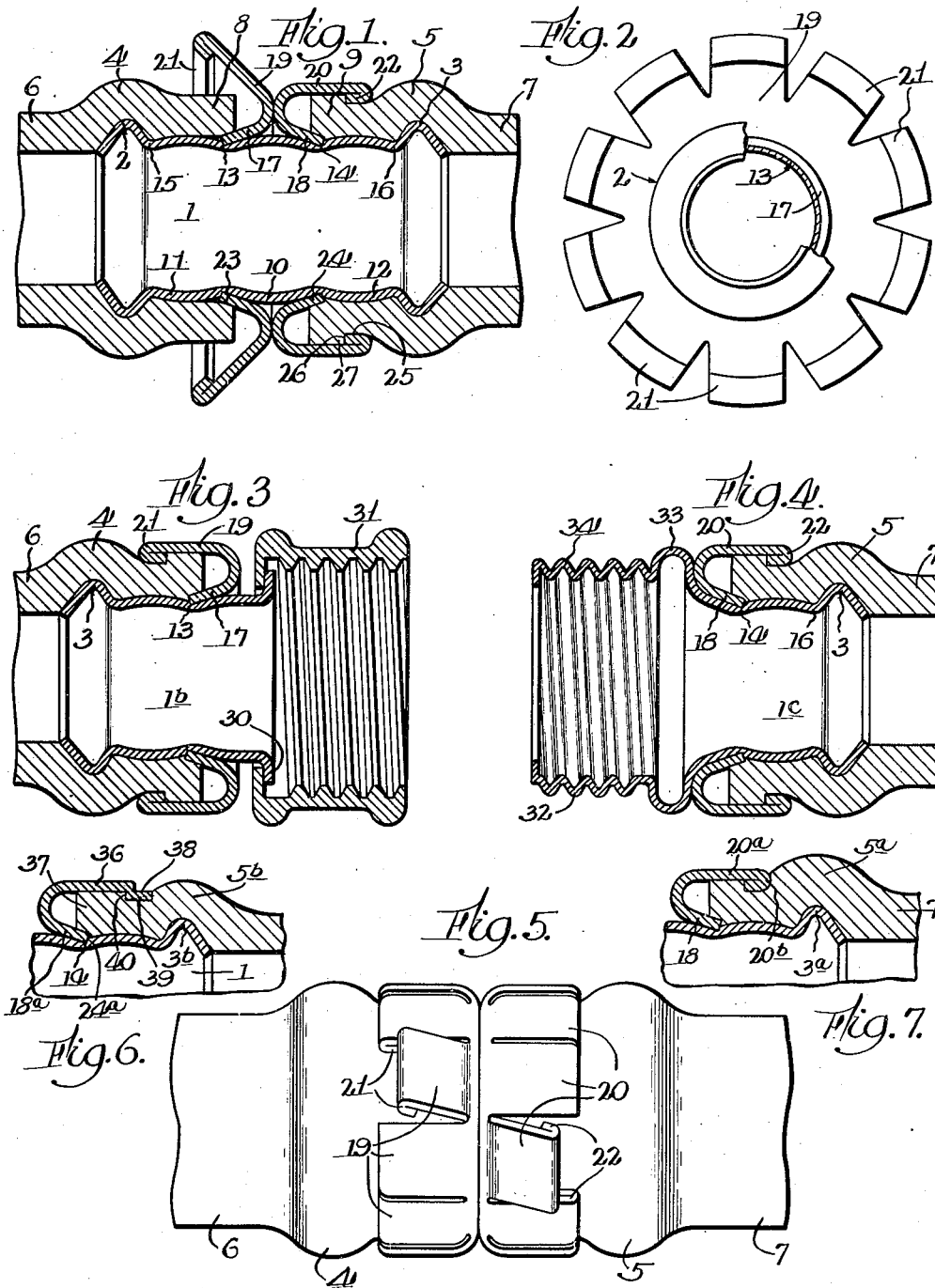

1,965,426

UNITED STATES PATENT OFFICE 1,965,426

HOSE CONNECTER AND THE LIKE

Lewen R. Nelson, Peoria, Ill.

Application February 27, 1933, Serial No. 658,794

3 Claims. (Cl. 285—77)

The present invention relates to devices for connections to hose, such as couplers, menders and the like.

A connecter such as shown in my Patents Nos. 1,321,323 and 1,321,324, usually comprises a tube to an end of which is connected an end portion of the hose and a claw secured to the tube and having fingers clamping the end portion of the hose to hold it connected to the tube. The fingers usually have bent ends or tips which dig into the material of the hose. That is often disadvantageous because the end of the tip pressing into the hose material may cut the hose and so injure it as to weaken it and the hose may break or tear at the place where the tips dig into the hose.

The present invention has as an object, the provision of a novel connecter with fingers, the body portions of which are pressed flat against the surface of the hose and the bent tips of which are pressed flatwise into the surface of the hose whereby there is a large area of contact or engagement so that there is no danger of so injuring the hose as to cause it to break, part or tear.

Another object of the invention is to provide such a novel device wherein the bent tips of the fingers will provide anchoring shoulders or the like to hold the hose from being pulled off of the connecter.

Other objects, advantages, capabilities and features are comprehended by the invention as will later appear and as are inherently possessed thereby.

Referring to the drawing:

Fig. 1 is a longitudinal sectional view through a device constructed in accordance with the invention;

Fig. 2 is an end view of a connecter with the fingers in position before pounding down on the hose;

Figs. 3 and 4 are longitudinal sectional views of coupling or connecting parts adapted to be coupled together or to a nozzle or fitting or the like;

Fig. 5 is a side view of a connecter showing some of the fingers clamped into place and a few fingers before pounding down in clamping position; and Figs. 6 and 7 are fractional sectional views through alternate or varied forms.

Referring more in detail to the drawing, the embodiments selected to illustrate the invention are shown as comprising a metal tubular member connected to a hose and carrying a claw or clamping means, the fingers of which are clamped upon the hose end portion to hold it tight with the tubular member.

In the form shown in Fig. 1 the connecter comprises a hollow metal tube 1 having spun enlargements 2 and 3 at the ends of the tube for the engagement thereof and therewith of portions 4 and 5 of the hose sections 6 and 7, the end portions 8 and 9 of the hose sections extending over intermediate portions of the tube 1. The body of the tube, as shown, may consist of a central annular portion 10, and intermediate annular portions 11 and 12 with grooved portions 1 and 14 between the central portion 10 and the intermediate portions 11 and 12, and also grooved portions 15 and 16 between the intermediate portions 11 and 12 and the enlargements 2 and 3. The portions 10, 11 and 12 are outwardly curved or convexed in a longitudinal or axial direction of the tube 1. On the body of the tubes are engaged clamping claw devices comprising inner rings 17 and 18 and series of outwardly extending fingers 19 and 20 having bent tips 21 and 22, the tips shown in Fig. 1 being bent back against the inner surfaces of the fingers 19 and 20. The rings 17 and 18 have their inner edges 23 and 24 engaged tightly in the grooves 13 and 14 with sufficient prehensile force as to be fast with the tube 1 whereby the claw devices will not turn on the tube and also will not move longitudinally on the tube.

The engagement of the rings 17 and 18 with the tubes may be effected in any of several ways. The tube 1 is produced from a straight hollow cylindrical tube and it attains the shape shown by the application of suitable tools.

In one method of production, a mandrel of proper size is introduced into the cylinder, and dies with tapered ends engage the rings 17 and 18 so as to cause the inner edges 23 and 24 of these rings to engage with and bite into the wall of the tube, thus producing the grooves 13 and 14 and the convexed portions 10, 11 and 12 as shown in Fig. 1. The enlargements 2 and 3 may be produced by spinning with suitable tools.

In another method, a mandrel of proper size is introduced in the tube cylinder, and dies apply pressure upon the ends of the cylinder to cause the body of the tubes to bulge about the edges 23 and 24 of the rings 17 and 18 whereby there is a biting or engagement of such edges 23 and 24 into the tubes at the grooves 13 and 14.

In another method, expanding tools are inserted in the tube cylinder and expanded to form the curved parts 10, 11 and 12 and to cause the edges 23 and 24 to bite into or engage with the tube at the grooves 13 and 14.

In still another method spinner rollers may be introduced in the tube cylinder and the tube so spun to form the curved portions 10, 11 and 12 and to cause the edges 17 and 18 to bite into or engage with the tube at the grooves 13 and 14.

In a still further method, dies with tapered or rounded ends and of larger diameter than the tube cylinder, are forced into the ends of the cylinder to form the curved parts 11 and 12, and then an expanding tool or a spinning roller is introduced to form the curved portion 10, thus causing the edges 17 and 18 to bite into or engage with the tube at the grooves 13 and 14. The enlargements 2 and 3 may then be formed by spinning as before stated.

The fingers 19 of the claw device are made to extend outwardly at a sufficient angle so as to afford ample space for the locating of the end portions 8 and 9 of the hose sections 6 and 7 for the engagement of the fingers therewith. The tip 21 or 22, in the form shown in Fig. 1, is bent back against the inner side or face of the body portion of the finger so as to present a large area surface 25 for engagement with the hose, and also to provide an anchoring edge or shoulder 26 adapted to abut against a shoulder portion 27 formed on the end portion of the hose. The surface 25 may be flat or slightly curved to conform with the curvature of the hose, but it has ample area for flatwise engagement with the hose.

In use, the hose end is forced over the enlargement 2 or 3 so as to prevent the end 8 or 9 of the hose over the portions 11 or 12 of the tubes and in the angular space between the rings 17 or 18 and the fingers 19 or 20, as clearly shown at the left in Fig. 1. Then the fingers are hammered down or otherwise forced into clamping engagement with the hose. The body portions of these fingers are clamped flatwise against the surface of the hose and the tips are clamped also flatwise into the surface portion of the material so as to form the shoulders 27 engaged by the edges or shoulders 26 at the ends of the tips 25.

Any force acting to pull the hose off of the tube is resisted by the anchoring shoulders 26 and 27 assisted by the frictional engagement of the fingers with the hose and the enlargements at the ends of the tube. There is no cutting of the hose as by the edges of tips bent at right angles to the body of the fingers. By providing a large area of surface contact between the fingers, especially the tips, there is a better and firmer engagement.

It will be noted that when the fingers are hammered into position, the edges of the fingers are adjacent and the fingers form a band or collar for the hose. The hose is confined between this series of fingers and the tube. Likewise, it will be noted that the adjacency of the fingers are such that the shoulders 26 and 27 will be continuous and annular.

The length of the fingers may be varied as desired, but it is preferable that they be of such a length as to make effective the buckle of the hose over the enlargements at the ends of the tube. This feature is emphasized in Fig. 7 wherein the finger 20$^a$ at its end 20$^b$ so crowds the portion 5$^a$ of the hose 7$^a$ as to make the buckling of the hose over the enlargement 3$^a$ more effective. In the forms shown in Figs. 3 and 4, is shown the adaption of the invention to connecters for connecting a hose to a fitting, such as may be connected to a nozzle, or to a faucet, a coupling part, or the like.

In Fig. 3, the tube 1$^b$ has a flange 30 at an end for cooperation with a coupling member 31 threaded for engagement to a nozzle or a faucet or another coupling member 32 as shown in Fig. 4. In the latter case, the tube 1$^c$ is formed at an end with a bead 33 and a thread portion 34 adapted for connection to the coupling part 31 (Fig. 3) or other fitting or the like.

In Fig. 6 is shown an alternate form of clamping or claw device comprising a ring 18$^a$ having its inner edge 24$^a$ engaged with the tube 1 at the groove 14 thereof. The fingers thereof each comprises a body portion 36 which is clamped flatwise against the hose portion 37 and a tip 38 which is so bent from the portion 36 as to lie flatwise against the hose, as shown in Fig. 6, and also to provide an anchoring shoulder 39 abutting against a shoulder portion 40 formed in the hose portion. The length of the finger and tip is such as to assist the buckling effect of the hose portion 5$^b$ humped over the enlargement 3$^b$ of the tube.

In both forms the anchoring shoulder 26 or 39 presents a surface which extends the width of the finger and which is in a plane at a normal to the force that might tend to pull off the hose from the tube, or in other words, that surface acts squarely against such force and against that portion of the hose which is confined between the tubes and the fingers. Since the face of the shoulder is square with the length of the connecter and hose, there is no inclined surface to act as a wedge to cause the hose to squeeze by the clamping means. Since the extent of the surface of the shoulder is for the full width of the finger, and since the sides of the fingers are adjacent when pounded down in clamping position, the shoulders of the fingers form a continuous or annular shoulder around the hose, and likewise the shoulder 27 or 40 of the hose is also continuous and annular.

While I have herein described and upon the drawings shown a few illustrative embodiments of the invention, it is to be understood that the invention is not limited thereto but comprehends other constructions, details, arrangements of parts, and features without departing from the spirit of the invention.

Having thus disclosed the invention,

I claim:

1. A hose connecting means comprising a tubular coupling member of a size and shape to enter an open end of the hose, and a hose grip member encircling and fixedly engaging said coupling member, said grip member having a plurality of relatively separated fingers, the metal forming the extremity of each finger being disposed in a plane nearer the coupling member than the body of said finger while the finger is engaged with the hose, and so constructed and arranged as to provide a flat tip having an inner shoulder, said tip being so disposed as to press flatwise into the material of the hose in such manner that the shoulder thereof will react against the hose portion confined between the fingers and the coupling member.

2. A hose connecting means comprising a tubular coupling member of a size and shape to enter an open end of the hose, and a hose grip member encircling and fixedly engaging said coupling member, said grip member having a plurality of relatively separated fingers, the metal forming the extremity of each finger being bent back upon itself to a position nearer the coupling member than the body of the finger while the finger is engaged with the hose, and so constructed and arranged as to provide a flat tip with the inner edge of the bent portion forming a shoulder, said tip being so disposed as to press flatwise into the material of the hose in such manner that the shoulder thereof will react against the hose portion confined between the fingers and the coupling member.

3. A hose connecting means comprising a tubular coupling member of a size and shape to enter an open end of the hose, and a hose grip member encircling and fixedly engaging said coupling member, said grip member having a plurality of relatively separated fingers, the metal forming the extremity of each finger having a projection offset from the body of the finger in such manner as to lie in a plane nearer the coupling member than the body of the finger while the finger is engaged with the hose, and so constructed and arranged as to provide a flat tip having an inner shoulder, said tip being so disposed as to press flatwise into the material of the hose in such manner that the shoulder thereof will react against the hose portion confined between the fingers and the coupling member.

LEWEN R. NELSON.